(12) United States Patent
Garduno Estebanez et al.

(10) Patent No.: US 11,821,403 B2
(45) Date of Patent: Nov. 21, 2023

(54) METHOD FOR ASSEMBLING A WIND TURBINE AND WIND TURBINE ASSEMBLED ACCORDING TO SAID METHOD

(71) Applicant: Nordex Energy Spain, S.A.U., Barasoain (ES)

(72) Inventors: Aitor Garduno Estebanez, Barasoain (ES); Alexandre Cal Hernandez, Barasoain (ES); Ivan Garcia Maestre, Barasoain (ES); Asier Gomez Andueza, Barasoain (ES); Vanessa Cerrillo Gomez, Barasoain (ES); Ander Gaston Lujambio, Barasoain (ES); Teresa Arlaban Gabeiras, Barasoain (ES); Jose Miguel Garcia Sayes, Barasoain (ES); Miguel Nunez Polo, Barasoain (ES)

(73) Assignee: NORDEX ENERGY SPAIN S.A.U., Barasoain (ES)

( * ) Notice: Subject to any disclaimer, the term of this patent is extended or adjusted under 35 U.S.C. 154(b) by 385 days.

(21) Appl. No.: 16/707,676

(22) Filed: Dec. 9, 2019

(65) Prior Publication Data
US 2020/0200148 A1 Jun. 25, 2020

(30) Foreign Application Priority Data
Dec. 21, 2018 (EP) .................................. 18382969

(51) Int. Cl.
*F03D 13/20* (2016.01)
*F03D 13/10* (2016.01)
(Continued)

(52) U.S. Cl.
CPC ............. *F03D 13/20* (2016.05); *F03D 13/10* (2016.05); *E04H 12/12* (2013.01); *E04H 12/342* (2013.01);
(Continued)

(58) Field of Classification Search
CPC ....... F03D 13/10; F03D 13/20; B66C 23/207; B66C 1/108; E04H 12/342; E04H 12/344; E04H 12/085
See application file for complete search history.

(56) References Cited

U.S. PATENT DOCUMENTS 7,694,473 B2 * 4/2010 Jakubowski ............ F03D 13/20
52/223.13
9,091,095 B2 * 7/2015 Bogl ....................... E04H 12/12
(Continued)

FOREIGN PATENT DOCUMENTS

EP 2541047 A2 1/2013

*Primary Examiner* — Justin D Seabe
(74) *Attorney, Agent, or Firm* — Hayes Soloway PC

(57) ABSTRACT

A method of assembling a wind turbine tower by stacking a plurality of annular sections made of concrete above each other. The main connections are performed between two adjacent annular sections, for withstanding loads induced by a rotor. The auxiliary connections are performed between two adjacent annular sections, for withstanding loads induced by an earthquake and loads induced by the wind on the wind turbine in absence of the rotor, but not necessarily loads induced by the rotor. The method is characterized in that the auxiliary connections between two adjacent annular sections are performed prior to stacking the following annular section.

21 Claims, 5 Drawing Sheets

(51) Int. Cl.
*E04H 12/34* (2006.01)
*E04H 12/12* (2006.01)

(52) U.S. Cl.
CPC ..... *F05B 2230/61* (2013.01); *F05B 2260/301* (2013.01)

(56) References Cited

U.S. PATENT DOCUMENTS

| | | | |
|---|---|---|---|
| 9,651,029 B2 * | 5/2017 | Hayden | E04H 12/08 |
| 10,519,685 B2 * | 12/2019 | Viselli | E04H 12/12 |
| 2012/0141295 A1 * | 6/2012 | Martinez De Castaneda | E04H 12/085 52/745.17 |
| 2012/0304588 A1 * | 12/2012 | von Ahn | E04H 12/18 52/745.17 |
| 2014/0298737 A1 * | 10/2014 | Fernandez Gomez | E04B 1/4121 52/220.1 |
| 2016/0245260 A1 * | 8/2016 | García Maestre | F03D 13/10 |

* cited by examiner

B-B'

METHOD FOR ASSEMBLING A WIND TURBINE AND WIND TURBINE ASSEMBLED ACCORDING TO SAID METHOD

CROSS-REFERENCE TO RELATED APPLICATIONS AND PRIORITY

This patent application claims priority from EP Patent Application No. 18382969.6 filed Dec. 21, 2018. This patent application is herein incorporated by reference in its entirety.

OBJECT OF THE INVENTION

The object of the invention is a method for assembling a wind turbine in locations where earthquakes may occur which, using suitable means, achieves a balance between the speed of execution of the assembly of the wind turbine and the guarantee that the tower will resist loads associated with possible earthquakes during the assembly.

Another object of the present invention is a wind turbine assembled according to the above method.

BACKGROUND OF THE INVENTION

The wind turbines comprise a tower, a nacelle which houses the electrical generator and a rotor formed in turn by at least two blades. The tower of the wind turbine supports the nacelle and the rotor. Large wind turbines have steel, lattice, or reinforced concrete towers or even mixed-type towers, the latter comprising sections of different materials, for example, a lower section of concrete and an upper section of steel or lattice.

Due to the height of the wind turbines, the tower has to be divided into several annular sections which are stacked during the wind turbine assembly stage thus forming the full height of the tower. Dividing the tower into sections has the advantage that each section has a size such that its transport by road or rail is easier.

One of the most commonly used materials for large towers is concrete, since it involves competitive costs and performance compared to those for the production of steel towers of similar characteristics. However, the weight of each concrete tower section can easily exceed one hundred tons, this fact being infrequent for metal tower sections, so stacking the concrete sections requires heavy-tonnage lifting and positioning means. The cost of using such lifting and positioning means, which may be for example a crane, is directly related to the tonnage and height that it is capable of handling and the time of use thereof. This high-tonnage crane is also used for lifting and positioning the nacelle, as the weight of the nacelle may also exceed 100 tons.

The design of wind turbine components and the design of the connections between them once placed, should take into account the loads they will have to bear throughout their useful life to ensure the proper functioning thereof. In particular, the connections between different concrete sections of the tower are adapted to withstand the loads they will have to bear throughout their useful life.

In addition to the expected loads that the wind turbine must bear, such as gravitational loads, assembly loads, inertial loads, aerodynamic loads, operational loads, etc., other loads must also be taken into account, depending on the location where the wind turbine is to be installed, such as earthquakes.

As it is known, an earthquake is a phenomenon of sudden and transient shaking of the surface of the Earth produced by the release of accumulated energy in the form of seismic waves, and of course, wind turbines do not escape this reality. Therefore, the construction period of the wind turbine is a very vulnerable situation, since a seismic event could occur during the assembly of the wind turbines, when the wind turbine components have not been fully fixed.

Document EP2541047 (Acciona Windpower) discloses a method for assembling a wind turbine comprising: a tower comprising a plurality of concrete annular sections; a nacelle and a rotor; the method comprising the nacelle on one upper section of the concrete annular sections, and then assembling the rotor to the nacelle, wherein main connections for connecting the concrete annular sections to each other using main connecting means for resisting the loads provoked by the rotor are performed after stacking the nacelle onto the upper annular section and before assembling the rotor to the nacelle. However, this method does not take into account the possibility of occurrence of earthquakes during the assembly of the wind turbine, so it would not be feasible for seismic locations.

Therefore, the method of the present invention solves the problem described above, by providing a method and a system capable of making the wind turbine subassembly stable during the assembly of the same in the event of an earthquake.

DESCRIPTION OF THE INVENTION

This invention describes the characteristics of connections between sections of the tower which are carried out during the assembly of the wind turbine that allow not only to execute them very quickly but also to minimize the risk of collapse of the wind turbine in the event of an earthquake.

More particularly, the invention provides a method for assembling a wind turbine comprising a stage wherein auxiliary connections are performed between a first and a second annular sections before stacking a third section, so that the possibility of an earthquake damaging the wind turbine during its assembly is minimized. This is achieved by reducing the time that the sections remain without any connection capable of withstanding said potential seismic loads.

The method object of the invention is implemented in a wind turbine comprising a tower, a nacelle and a rotor. The tower is of the type comprising stackable annular sections, wherein at least two of these annular sections, e.g a first and a second annular sections, are made preferably of concrete.

As a general concept, according to the method of the invention, all annular sections are consecutively stacked upon each other, wherein one of the annular sections, referred to as "top annular section", is stacked atop of all the other annular sections, and finally the nacelle is stacked upon the top annular section. The auxiliary connections are performed not only for connecting the second annular section to the first annular section, but also auxiliary connections are performed, for connecting the third annular section to the second annular section, after the third annular section is stacked, but before a fourth annular section, or the nacelle, are stacked, an so on.

As a consequence, during the period of time that it takes the wind turbine to be completely assembled, the wind turbine is protected against eventual seismic loads, since auxiliary connections are provided as the annular sections are being stacked.

For withstanding all operation loads induced by the wind on the wind turbine including the rotor, main connections, as explained below, are performed connecting the first and the second annular sections to each other; in general, the main connections connect each pair of consecutively stacked annular sections to each other, as well as the top annular section and the nacelle to each other.

The execution of the auxiliary connection takes substantially less time than the execution of the main connections. In general, this applies to all auxiliary connections with respect to corresponding main connections, for all annular sections. This fact, together with the fact that the execution of the auxiliary connection connecting the first and the second annular section to each other, is made prior to the stacking of the third annular section, brings the consequence that the assembling method proposed minimizes, on the one hand, damage caused to the tower as it is being mounted at each step of the assembling, as well as also minimizes the possibility that the tower could crumble during an earthquake and, on the other hand, minimizes the spectrum of earthquake loads that would potentially affect the tower as mounted at each step, by reducing the time at which sections remain without an auxiliary connection that withstand said potential loads.

The auxiliary connections are configured to acquire a first resistance level needed to withstand loads induced by an earthquake in a first time and the main connections are configured to acquire a second resistance level needed to withstand all the operation loads of the wind turbine in a second time, wherein the second time is longer than the first time.

DESCRIPTION OF THE FIGURES

To complement the description being made and for the sake of a better understanding of the characteristics of the invention according to a preferred practical embodiment thereof, attached as an integral part of said description are a set of drawings wherein, for the purpose of illustration and not limiting the scope of the invention, the following is shown.

PREFERRED EMBODIMENT OF THE INVENTION

Figure 1:
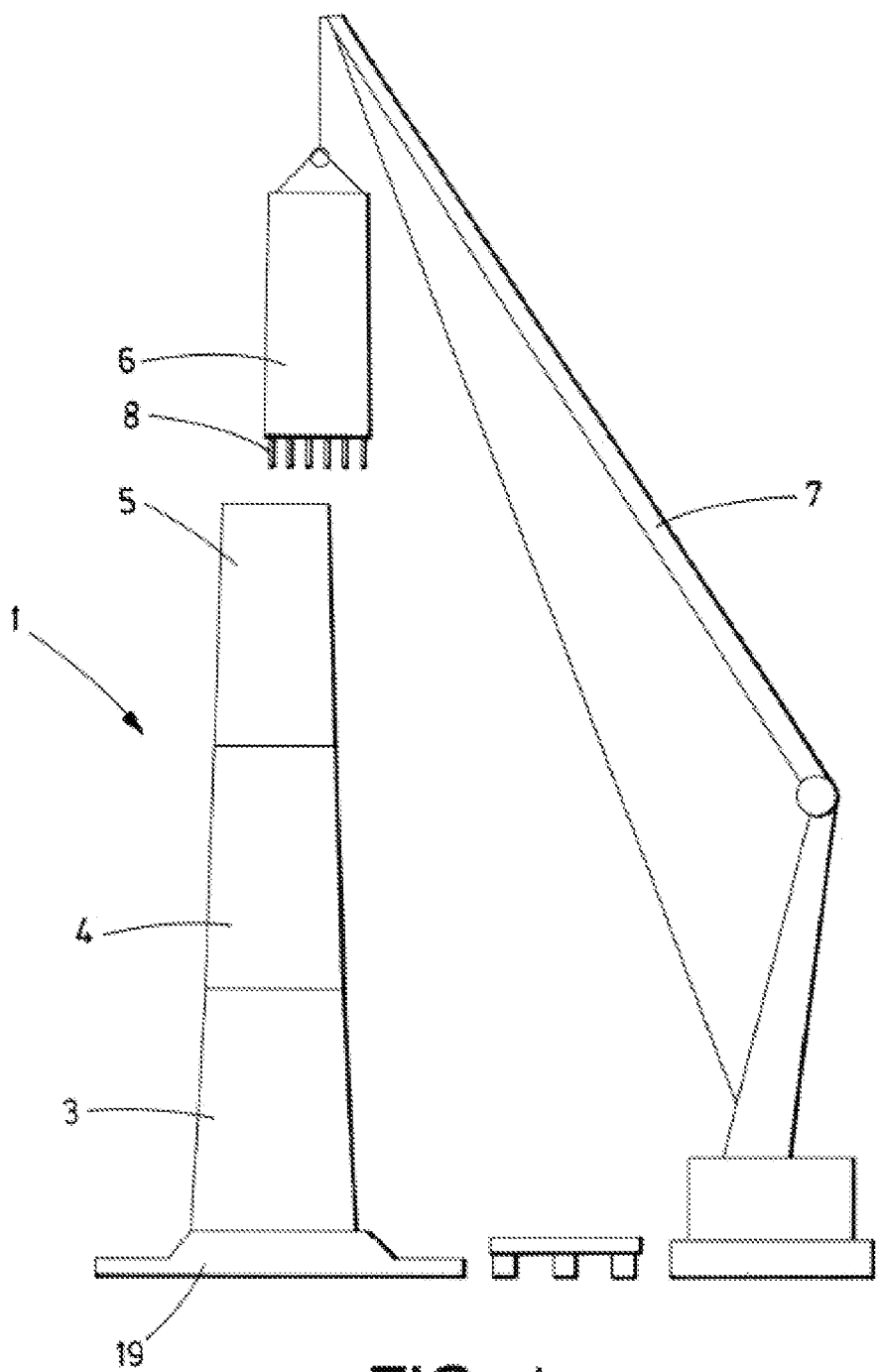
FIG. 1.—Shows a schematic view of a particular embodiment wherein the tower comprises stackable sections and a crane is stacking a section onto the lower sections.

Next, a detailed description of a preferred embodiment of the present invention shall be provided, with the help of the above referred FIGS. 1-6

The invention relates, according to a first aspect thereof, to an assembly method for a wind turbine comprising a tower (1), a nacelle (2) and a rotor. The tower (1) is of the type comprising stackable annular sections (3, 4, 5, 6), wherein at least two of the annular sections (3, 4, 5, 6), e.g. a first (3) and a second (4) annular sections, are made of concrete.

This method can be applied to any wind-turbine tower (1) regardless the number of concrete annular sections that it comprises.

The annular sections (3, 4, 5, 6) may comprise, besides first (3) and second (4) annular sections, at least one further annular section (5, 6), made of concrete. The tower (1) may additionally comprise other annular sections (not shown in the figures) which are not made of concrete but, for example are made of steel.

The method of the invention relates to stacking, upon the first annular section (3), the second annular section (4) and, once the second annular section is stacked, connecting the first annular section (3) to the second annular section (4) by means of performing auxiliary connections capable of withstanding seismic loads induced by an earthquake, for allowing the tower (1) to withstand loads induced by an earthquake that may occur during assembling.

When the tower (1) comprises the further annular sections (5, 6) made of concrete, the invention relates to a repetitive method, wherein all concrete annular sections (3, 4, 5, 6) are consecutively stacked upon each other, i.e. the third annular section (5) is stacked upon the second annular section (4), the fourth annular section (6) is stacked upon the third annular section (5), and so on, until all concrete annular sections (3, 4, 5, 6) are stacked. Then, if the tower (1) comprises the above-referred non-concrete annular section, these are stacked upon the concrete annular sections (3, 4, 5, 6). Finally, the nacelle (2) and the rotor are mounted atop of all stacked annular sections, whether concrete or non-concrete.

FIG. 1 shows part of the assembly method of the invention. By means of a lifting and positioning means (7), such as a crane (7), all annular sections (3, 4, 5, 6) of the tower (1) are lifted and positioned in a stacked manner.

For connecting the annular sections (3, 4, 5, 6) to each other, auxiliary connections are provided, performed by auxiliary connection means, and which are intended to withstand seismic loads induced by an earthquake, for allowing the tower to withstand loads induced by an earthquake that may occur during the assembling. According to a preferred embodiment, the auxiliary connections may further be intended to withstand loads induced by the wind on the wind turbine in absence of the rotor, but not loads induced by the rotor and the wind in the rotor. According to a more preferred embodiment, the auxiliary connections may be further intended to withstand loads induced by the wind on the wind turbine including the rotor, preferably with the blades in a feathered position. More preferably with the blades in a feathered position when the wind turbine is not operating. In the feathered position, the blades do not barely offer any resistance to the wind, therefore the rotor is freely rotatable, although much slower than in operation, so that the loads in the feathered position are much lower that the operation loads.

The auxiliary connections, besides withstanding loads induced by the wind on the wind turbine, including the rotor with the blades in a feathered position, are capable of transmitting self-weight loads and loads induced by an earthquake to the base of the tower (1), withstanding not only compression stress but also bending, tensile and shear stress and enabling loads to be withstood during the assembly. According to the above, the auxiliary connections, when property dimensioned, allow the rotor to be mounted using the same crane (7) without needing to previously perform the main connections, which would be performed later, thereby releasing the crane (7) for mounting another wind turbine or being dismantled.

The method of the invention stands out in that the auxiliary connections for the first (3) and the second annular section (4) are performed before any other annular section, whether concrete or non-concrete, is stacked upon the second annular section (4).

In the case wherein the tower (1) comprises the further concrete annular sections (5, 6), auxiliary connections are also performed after each concrete annular section (4, 5, 6) is stacked, but before any next annular section (whether concrete or non-concrete) or the nacelle, are stacked.

In particular, in the following steps of the method, after the first (3) and the second (4) annular sections have been stacked and auxiliary connections have already been performed for connecting the second (4) and the first (3) annular sections to each other, the steps of stacking and performing auxiliary connections are performed for any further annular concrete section (5, 6), so that the auxiliary connections still allow the connected sections (4, 5, 6) to withstand loads induced by an earthquake that may occur during the assembly. This step is repeated with the rest of the concrete annular sections (5, 6) until all concrete annular sections (3, 4, 5, 6) are stacked upon each other.

What is intended by performing auxiliary connections immediately after stacking each annular section (3, 4, 5), but before any next annular sections or the nacelle is stacked, is finding a balance between, on one side, a reduced time-consuming assembly method of the wind turbine and, on the other side, a lower risk of the wind turbine collapsing in case of an eventual earthquake during the assembling thereof. Also, once the tower (1) is securely assembled and comprises all the required auxiliary connections performed, the use of the large-tonnage crane (7) is no longer necessary, since the auxiliary connections ensure that the tower (1) will not to be damaged nor collapse due to potential earthquakes. Therefore, the crane (7) may be moved to another location and devoted to other assembly tasks in other wind turbines within the wind farm. Thus, the time of use of the large-tonnage crane (7) is reduced when constructing a tower (1) or a set of towers (1) with this method.

Besides the above-referred auxiliary connections, each pair of adjacent annular sections (3, 4, 5, 6) are further connected to each other, as well as a top annular section, whether concrete or non-concrete, and which is stacked atop of all stacked annular sections, is connected to the nacelle (2), by means of main connections, which are intended to withstand all operation loads induced by the wind (and possible earthquakes) on the wind turbine including the rotor.

According to a preferred embodiment, the main connection connecting the nacelle (2) to the top annular section is performed before performing any of the main connections connecting the annular sections (3, 4, 5, 6) to each other, wherein the main connections connecting annular sections (3, 4, 5, 6) located upwardly are performed before those for annular sections (3, 4, 5, 6) located near the bottom due to the upper sections have a greater possibility of overturning in case of earthquakes. Alternatively, the main connections may be performed beginning with a bottom part of the tower (1), i.e., first the main connection connecting the first annular section (3) to the second annular section (4), and then the main connection connecting the second annular sections (4) to the third annular section (5) and so on.

Figure 2:
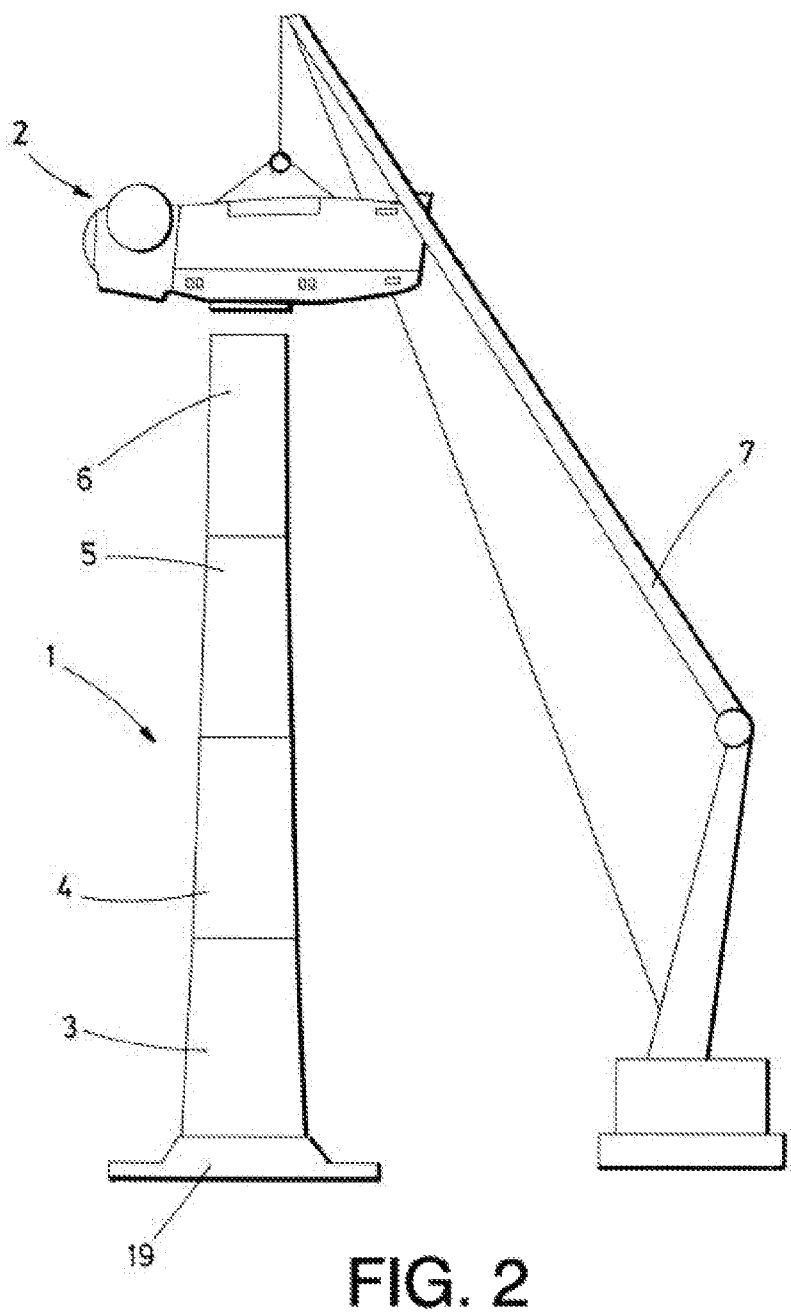
FIG. 2.—Shows a schematic view of a tower comprising four stacked sections wherein a crane is stacking the nacelle onto the top section.

FIG. 2 represents a step of the method object of the invention wherein, by means of the crane (7), the nacelle (2) is lifted and positioned onto the top annular section. Later a main connection must be performed for connecting the nacelle (2) and the upper annular section (6). Finally, main connections are performed for connecting all the concrete annular sections (3, 4, 5, 6) to each other by means of main connecting means.

Also preferably, the auxiliary connections are further configured to acquire a first resistance level needed to withstand loads induced by an earthquake in a first time and the main connections are configured to acquire a second resistance level needed to withstand all the operation loads of the wind turbine in a second time, longer than the first time.

As explained above, at least the first (3) and the second (4) annular sections are made of concrete. Preferably, one, some or all, of the further annular sections (5, 6) are also made of concrete. In particular, the top annular section (6) may also be made of concrete. However, as an alternative, the tower (1) may comprise other annular sections not made of concrete but, for instance, selected types of steel, the annular sections (3, 4, 5, 6) made of concrete occupying the lower position, wherein the annular sections not made of concrete would be stacked upon the annular sections (3, 4, 5, 6) made of concrete.

Figure 3:
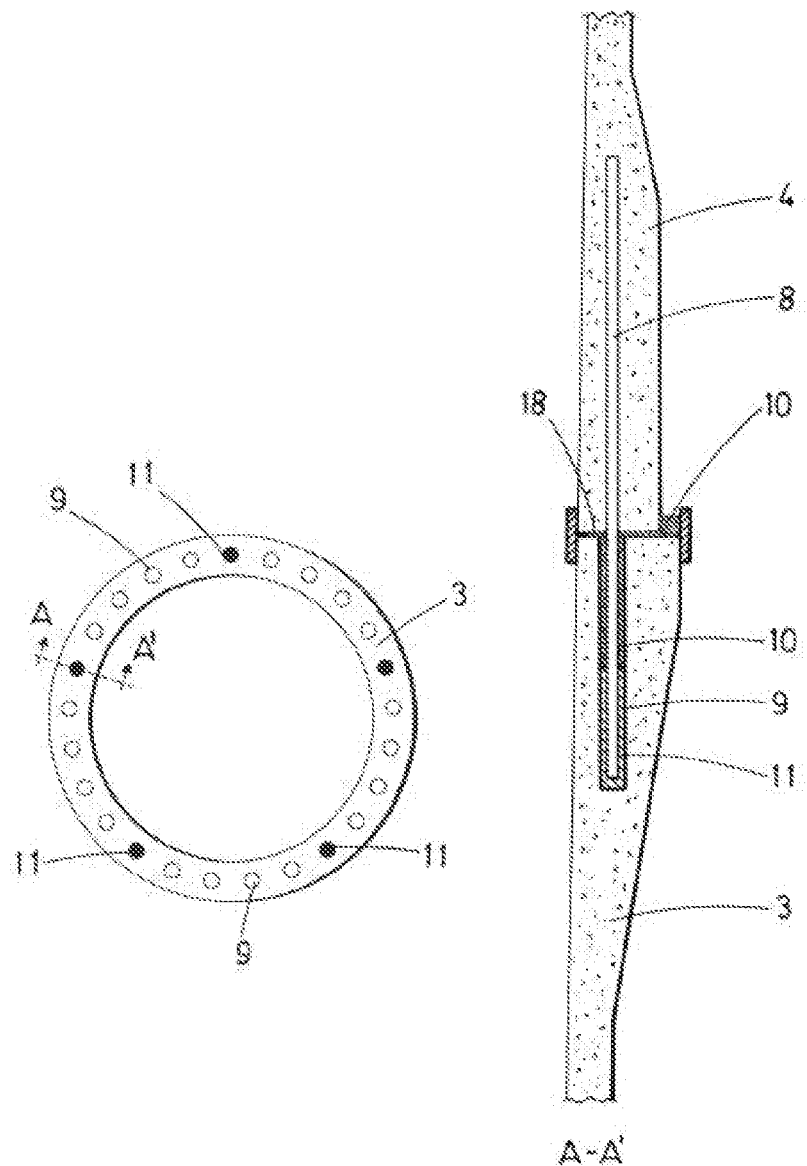
FIG. 3.—Shows a schematic view of a section along a vertical plane of two adjacent sections and a plan view of the lower section which shows a first embodiment of auxiliary connections of sections to each other.

According to a preferred embodiment for performing the auxiliary connections, see FIG. 3, the first annular section (3) comprises housings (9), located in an upper flange of the first annular section (3), and the second annular section (4) comprises bars (8) emanating at least from a lower flange of the second annular section (4). The housings (9) of the first annular section (3) are configured to allocate the bars (8) of the second annular section (4), for defining bar (8)-housing (9) assemblies wherein the bars (8) are inserted into the housings (9). In general, for each pair of adjacent annular sections (3, 4, 5, 6) made of concrete, one of the adjacent annular sections (3, 4, 5, 6), referred to as upper annular section (4, 5, 6) is stacked upon the other adjacent annular section (3, 4, 5, 6), referred to as lower annular section (3, 4, 5), wherein the upper annular section (4, 5, 6) has bars (8) as explained above for the second annular section (4), whereas the lower annular section (3, 4, 5) has housings (9) as explained above for the first annular section (3).

FIG. 3 also shows the connection between a lower and an upper annular sections, specifically first (3) and second (4) annular sections. Once the bars (8) have been introduced into the housings (9), the auxiliary connections are later performed.

Figure 4:
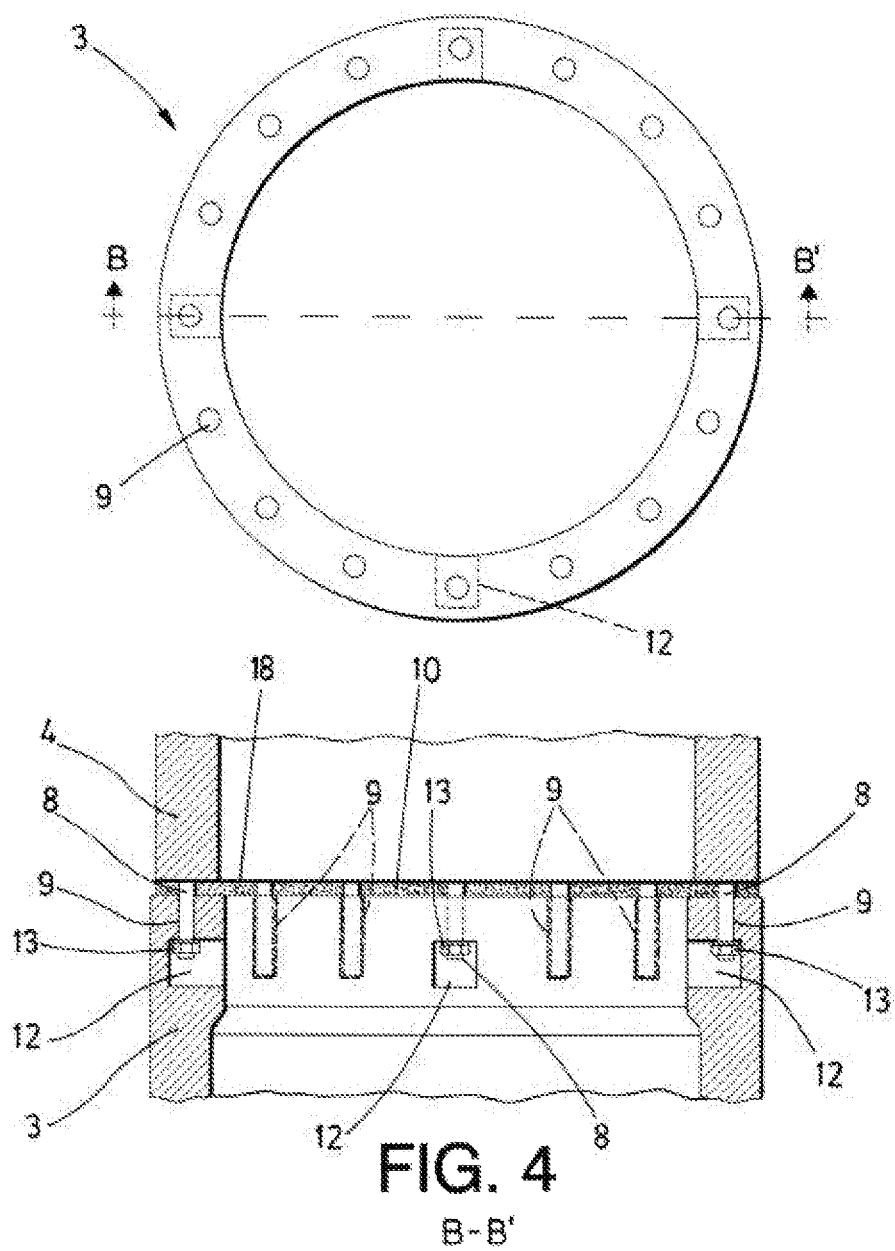
FIG. 4.—Shows a schematic view of a section along a vertical plane of two adjacent sections and a plan view of the lower section which shows a second embodiment of auxiliary connections of sections to each other.
Figure 5:
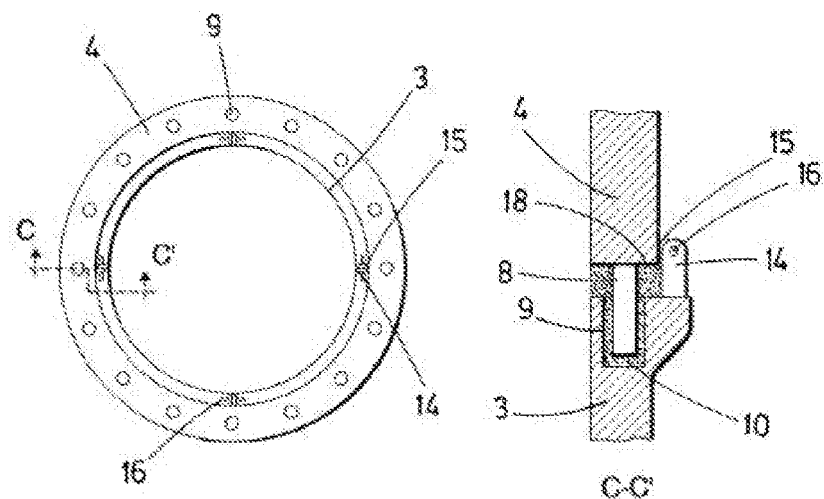
FIG. 5.—Shows a schematic view of a section along a vertical plane of two adjacent sections and a plan view of the lower section which shows a third embodiment of auxiliary connections of sections to each other.

Preferably, the housings (9) are distributed homogeneously along the upper flange of each lower annular section (3, 4, 5); for instance, the housings (9) are located perimetrally, at a uniform angular spacing, as seen on FIGS. 3-5.

For performing the auxiliary connections, once the upper annular section has been stacked over the lower annular section, and always before stacking another annular section over the upper annular section, the resin (11) is inserted (preferably poured) in at least one of the housings (9) of the lower annular section (3, 4, 5). In particular, resin (11) may be inserted so that some or all of the housings (9) are partially or totally filled with resin (11). Preferably, only some, but not all, of the housings (9), for instance, between 20% and 40%, are partially or completely filled with resin (11). The housings (9) which are filled with resin (11) are preferably filled up to 30%, more preferably up to 40%, of the volume of the housings (9). The resin (11) is preferably inserted in non-contiguous housings (9), see FIG. 3.

As a result of the resin (11) having been hardened, a temporary anchor is achieved. This ensures that the bars (8) withstand bending (flexion) stress during the assembly of the wind turbine in the case of lateral loads due to the effect of eventual earthquakes.

Stacking an annular section (4, 5, 6) upon a previously mounted annular section (3, 4, 5) may take a stacking time of approximately 3 hours. According to a preferred embodiment, performing any auxiliary connection takes a time which is shorter than the stacking time, so that the assembling of the wind turbine is not delayed by performing the auxiliary connections. The time taken for performing an auxiliary connection may be preselected by, for instance, selecting an appropriate kind of resin (11).

Preferably, by way of example, the step of partially filling with resin (11) in some or all the housings (9) takes a first predetermined time which is preferably 40 minutes or less, more preferably 30 minutes or less. Later, a second predetermined time after the housing (9) is partially filled, for allowing the resin (11) to cure, may be waited, before stacking the third annular section (5) or the nacelle (2) upon the second annular section (4). As explained above, the combined duration of the first and the second predetermined times is preferably less than the stacking time, preferably less than three hours.

The partial application of resin (11) in the housings (9) of each annular concrete section (3, 4, 5, 6), as explained above, is preferably done in a time shorter than or equal to the first pre-set time of application of the resin (11) in order to reduce the possibility of the tower (1) collapsing in the eventual occurrence of an earthquake and also in order to reduce the spectrum of loads that the auxiliary connection has to withstand; if the application of resin (11) takes more time, the exposure time increases, and the greater the exposure time the higher the probability of having an earthquake of a greater magnitude. This is achieved because the auxiliary connections enable the tower (1) to withstand the loads that may suffer the structure in such an event. In this sense, the sooner the auxiliary connections are finished, the lower the exposure time of the annular sections (3, 4, 5, 6) to a potential earthquake without safe connections.

For performing the main connections between adjacent annular sections (3, 4, 5, 6), the housings (9) that are partially filled with resin (11) are completed later by totally being filled with grout (10). Additionally, grout (10) is inserted in the (empty) housings (9) wherein resin (11) has not been inserted. According to a preferred embodiment, performing the main connections may comprise a further stage of inserting (for example, pouring) grout (10), or a functionally equivalent product, for filling the gap (18) that exists between each pair of consecutively-stacked annular sections (3, 4, 5, 6). Concrete may be used instead or grout (10). Resin (11) may also be used instead of grout (10).

As it has been mentioned before, later on, by performing the main connections, a final connection will be achieved by filling with grout (10) the remaining empty volume in the housings (9), i.e. the volume not filled with resin (10), so that all the bars (8) substantially withstand the same loads.

FIG. 3 shows an embodiment in which, after the execution of the main connections, some of the housings (9) will comprise resin (11) in a lower area and grout (10) in the upper area, and the gap (18) that exists between the two adjacent annular sections (specifically the first (3) and the second (4) annular sections) is filled with grout (10).

Performing the main connections connecting the nacelle (2) and the top annular section (6) to each other may comprise fastening the nacelle (2) and the top annular section (6) with retaining elements.

FIG. 4 shows a second embodiment of the auxiliary connections. According to such embodiment, at a lower part of at least one of the housings (9) there is a recess (12) which is open towards the interior of the lower annular section (3, 4, 5), so that the step of performing the auxiliary connections comprises the following stages:
  accessing the bars (8) of the upper annular section (4, 5, 6) through the recesses (12) of the lower annular section (3, 4, 5), and
  fastening a retaining element (13) to the bar (8) within the recess (12).

Main connections show grout (10) inserted in the housings (9) and in the gap (18) that exists between the two adjacent annular sections.

FIG. 5 shows an alternative embodiment for the auxiliary connections wherein lugs (14, 15) and dowel rods (16) are used. According to such an embodiment, the auxiliary connections may be performed by means of first lugs (14) which are integral with, or attached to, the upper flange of the lower annular section (3, 4, 5), and second lugs (15) which are integral with, or attached to, the lower flange of the upper annular section (4, 5, 6), so that the performing of the auxiliary connections comprises the stages of:
  connecting the first lugs (14) to the second lugs (15) by interposing dowel rods (16) therebetween, and
  blocking the dowel rods (16).

Said lugs (14, 15) can be positioned and fixed to the walls of the annular sections (3, 4, 5, 6) in a factory at the time of manufacture thereof, or alternatively performed on site when assembling the wind turbine. Preferably, and for each connection, one of the first lugs (14) is factory-fixed to one of the sections (3) and another one of the second lugs (15) is fixed to the adjacent section (4) when assembling the tower (1), allowing adjustment of the position to ensure contact of the planes of any first lug (14) and corresponding second lug (15). Thus, the problems of tolerances in components of large dimensions are overcome.

Main connections show grout (10) inserted in the housings (9) and in the gap (18) that exists between the two adjacent annular sections.

The method for performing the auxiliary connections involving annular sections (3, 4, 5, 6) of the tower (1), according to the invention, is time-wise far less costly than performing the main connections involving said annular sections (3, 4, 5, 6). Thus, the operating time of the crane (7), which is a high-tonnage crane (7), can be reduced, as the components of the wind turbine including nacelle (2) and tower (1) will be safely connected through connections that enable the assembly to stand the loads related to phenomenon that may occur during the assembly stage. Later, the main connections required for standing all the operational loads of the wind turbine and hence performed before turning on the wind turbine so that it can start generating power, can be performed using other means different than the high-tonnage crane (7).

The speed of execution of the auxiliary connections enables the entire process to be performed continuously using a single crane (7) and thus reduce the operating time of the high-tonnage crane (7) for the assembly of the wind turbine. Said crane (7) can be used once the auxiliary connections are performed and all the heavy components stacked to assemble another wind turbine in the wind farm.

Taking into account the properties of the resin (11) and grout (10), mainly Young's modulus (E), and establishing an adequate ratio between the dimensions of the areas that include resin (11) and the dimensions of the areas that includes grout (10), suitable properties of strength of the final union are reached. In general, the Young's modulus (E) achieved by the resin (11) is lower than that achieved by the grout (10), so that if the whole housings (9) were filled only with resin (11), the bars (8) inserted into these housings (9) would withstand lower load than the bars (8) inserted in those housings (9) filled only with grout (10). In one embodiment, the dimension of the area of the housing (9) including resin (11) is less than 50% of the total volume of the housing (9). In this way, the bars (8) that are inserted in these housings (9), after being completely filled with grout (10) and after the grout (10) has set, work similarly to the rest of the bars (8) inserted in housings (9) filled only with grout (10) despite the different properties (Young modulus) of resin and grout. The total time required for carrying out the main connections is the sum of that required to perform the grout (10) injection, plus the time required for the grout (10) to cure in each of the main connections. Therefore, the total execution time of main connections amounts to over 24 hours in general, often being over 48 or even 72 hours.

Once all the main connections have been performed, the rotor is placed, and the wind turbine is capable of withstanding all operational loads induced by said rotor once in operation (due to the wind acting on the surface of the blades and the rotor's own weight).

Figure 6:
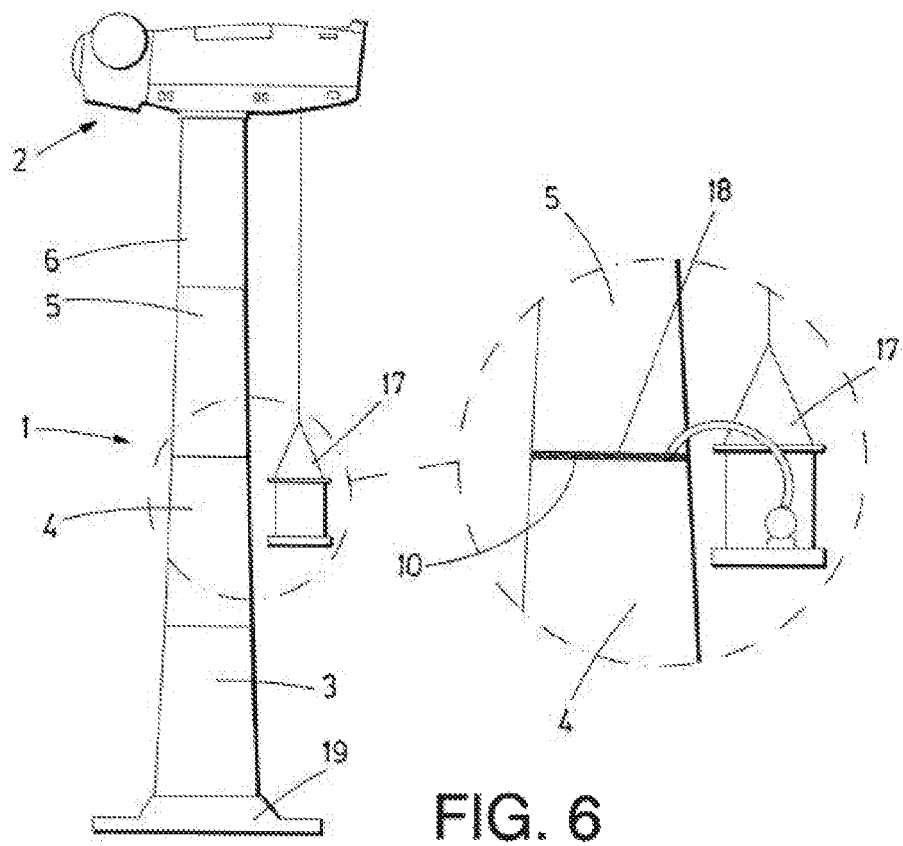
FIG. 6.—Shows a schematic view of an embodiment of the main connections.

FIG. 6 shows an embodiment for accessing the joints between the concrete annular sections (3, 4, 5, 6) and for performing the main connections, wherein lifting means are used which comprise a hanging platform (17) suspended from the nacelle (2) or from the upper section (6) of the tower (1), thus avoiding the use of large cranes (7) or intermediate platforms.

Preferably, the tower (1) is a frustoconical tower (1).

Below, a table is shown, indicating, as a percentage, a ratio of the number of housings (9) filled with resin (11) with respect to the total number of housings (9) for each annular section, as a function of the height at which the annular section is located. As can be observed, there are 6 annular sections defining 5 joints. The total volume filled of the set of housings (9) decreases as the height is increased, however in the annular section (5) immediately below the upper annular section (6), corresponding to a height of 100 m, it increases. The lowest line of the chart (TOTAL) indicates the percentage ratio of the housings (9) filled with resin (11) with respect to the total number of housings (9) for the whole tower (1).

| H(m) | % |
| --- | --- |
| 100 | 27 |
| 80 | 25 |
| 60 | 27 |
| 40 | 35 |
| 20 | 39 |
| TOTAL | 30 |

The connection for connecting the lowest annular section and the foundation (19), and the connection for connecting the top annular section (6) (the highest section) and the nacelle (2) are main connections, do not make use of auxiliary connections.

The invention also relates, according to a second aspect, to a wind turbine comprising a tower (1), a nacelle (2) and a rotor, wherein the wind turbine is assembled according to the method described above.

The invention claimed is:

1. A method for assembling a wind turbine, wherein the wind turbine comprises a tower, a nacelle and a rotor, the tower comprising stackable annular sections comprising housings, wherein the method comprises the following steps:
    stacking, upon a first annular section, a second annular section;
    performing auxiliary connections for connecting the first and the second annular sections to each other,
wherein the first annular section comprises an upper flange with housings, wherein the second annular section comprises a lower flange wherefrom bars extend, so that the housings receive the bars, leaving a gap between the bars and an interior wall of the housings, defining bar-housing assemblies, wherein the step of performing auxiliary connections comprises the insertion of resin only partially filling the gap in at least one of the housings;
wherein the auxiliary connections are performed prior to stacking a third annular section upon the second annular section.

2. The method according to claim 1, wherein it further comprises the steps of:
    once the auxiliary connections for connecting the first annular section to the second annular section have been performed, stacking, upon the second annular section, the third annular section, wherein the third annular section stays atop of all stacked annular sections;
    performing auxiliary connections for connecting the stacked third annular section to the second annular section; and
    repeating the above referred two steps, wherein a plurality of annular sections is stacked upon each other, and corresponding auxiliary connections for connecting any two consecutively stacked annular sections are performed, wherein the auxiliary connections are performed before stacking another annular section.

3. The method according to claim 1, further comprising stacking the nacelle above all stacked annular sections, wherein the auxiliary connections are further configured to withstand loads induced by the wind on the wind turbine in absence of the rotor.

4. The method according to claim 3, further comprising attaching the rotor to the nacelle, wherein the auxiliary connections are further configured to withstand loads induced by the wind on the wind turbine including the rotor with the blades in a feathered position.

5. The method according to claim 1, further comprising a step of performing main connections for connecting the first and the second annular sections to each other, thereby intended to withstand all operation loads induced by the wind on the wind turbine including the rotor.

6. The method according to claim 2, further comprising:
    a step of performing main connections for connecting the first and the second annular sections to each other intended to withstand all operation loads induced by the wind on the wind turbine including the rotor, the step of performing main connections further comprising:
        performing at least one of the main connections connecting any two adjacent annular sections to each other; and
        performing one of the main connections connecting the nacelle and the top annular section to each other before performing the main connections connecting the any two adjacent annular sections to each other.

7. The method according to claim 5, wherein the auxiliary connections are further configured to acquire a first resistance level needed to withstand loads induced by an earthquake in a first time and the main connections are configured to acquire a second resistance level needed to withstand all the operation loads of the wind turbine in a second time longer than the first time.

8. The method according to claim 1, wherein at least the first and second annular sections are made of concrete.

9. The method according to claim 1, wherein the step of performing the auxiliary connections comprises at least one of the following:
completely filling with resin only some of the housings; and
partially filling with resin all the housings.

10. The method according to claim 9, wherein a number of filled housings, which is lower than the total number of housings located in the upper flange of the first annular section, is filled at least partially with resin.

11. The method according to claim 1,
wherein
the step of performing the auxiliary connections comprises partially filling with resin at least some of the housings, and the step of performing main connections for connecting the first annular section and the second annular section to each other comprises:
completing the filling of the housings that already comprise resin with grout; and
filling with grout any of the housings that do not contain resin.

12. The method according to claim 11, wherein the step of performing the main connections further comprises filling with grout a gap between the first and the second annular sections.

13. The method according to claim 1, wherein the housings are distributed homogeneously along the upper flange of the annular sections.

14. The method according to claim 1, wherein the insertion of resin at least partially filling the gap in at least one of the housings takes a first predetermined time which is 40 minutes or less.

15. The method according to claim 14, further comprising a step of waiting a second predetermined time after the insertion of resin at least partially filling the gap in at least one of the housings, for allowing the resin to cure, before stacking the third annular section or the nacelle upon the second annular section.

16. The method according to claim 15, wherein the combined duration of the first predetermined time plus the second predetermined time is lower than a stacking time necessary for stacking an annular section upon a previously mounted annular section.

17. The method according to claim 1, further comprising a recess at a lower part of at least one of the housings which is open towards the interior of the lower annular section wherein the step of performing the first auxiliary connections comprises the following stages:
accessing the bars of the upper annular section through the recesses of the lower annular section; and
fastening a retaining element to the bar within the recess.

18. The method according to claim 1, wherein, first lugs are attached to, or integral with, the upper flange of the lower annular section, as well as and second lugs are attached to, or integral with, the lower flange of the upper annular section, wherein performing the auxiliary connections comprises the stages of:
connecting the first lugs to the second lugs by interposing dowel rods therebetween; and
blocking the dowel rods.

19. The method according to claim 1, wherein the step or steps of performing any auxiliary connection take a time which is shorter than the time of the step or steps of stacking.

20. A wind turbine comprising a tower, a nacelle and a rotor, wherein the tower comprises:
stackable annular sections, at least a lower annular section and an upper annular section, wherein the upper annular section is stacked upon the lower annular section; and
auxiliary connections to connect the lower and the upper annular sections to each other,
wherein the lower annular section of each pair of annular sections connected by the auxiliary connections comprises an upper flange with housings, wherein the upper annular section comprises a lower flange wherefrom bars extend, so that the housings are configured to allocate the bars leaving a gap between the bars and an interior wall of the housings, defining bar-housing assemblies for performing the auxiliary connections;
further comprising:
resin only partially filling the gap of at least one of the bar-housing assemblies and grout filling a remainder of the gap of the at least one of the bar-housing assemblies.

21. The wind turbine of claim 20 wherein
the auxiliary connections further comprises one of:
at least one gap of at least a second of the bar-housing assemblies completely filled with only one of resin or grout; or
resin partially filling each of the gaps of the bar-housing assemblies and grout filling a remainder of each of the gaps of the bar-housing assemblies, for performing main connections for connecting the lower annular section and the upper annular section to each other.

* * * * *